US007222298B2

(12) United States Patent
Monterrosas

(10) Patent No.: US 7,222,298 B2
(45) Date of Patent: May 22, 2007

(54) ADVANCED JAVA RICH TEXT FORMAT GENERATOR

(75) Inventor: Andres Alfonso Monterrosas, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 613 days.

(21) Appl. No.: 10/292,098

(22) Filed: Nov. 12, 2002

(65) Prior Publication Data

US 2004/0093560 A1    May 13, 2004

(51) Int. Cl.
*G06F 15/00* (2006.01)

(52) U.S. Cl. ...................... 715/530; 715/513
(58) Field of Classification Search ............. 715/513, 715/530, 531
See application file for complete search history.

(56) References Cited

U.S. PATENT DOCUMENTS

| | | | | |
|---|---|---|---|---|
| 5,892,513 | A * | 4/1999 | Fay | 715/854 |
| 5,911,776 | A * | 6/1999 | Guck | 709/217 |
| 6,029,182 | A | 2/2000 | Nehab et al. | 707/523 |
| 6,134,539 | A | 10/2000 | O'Connor et al. | 706/45 |
| 6,177,936 | B1 * | 1/2001 | Cragun | 715/760 |
| 6,182,092 | B1 * | 1/2001 | Francis et al. | 715/513 |
| 6,192,381 | B1 | 2/2001 | Stiegemeider et al. | 707/505 |
| 6,259,445 | B1 | 7/2001 | Hennum et al. | 345/338 |
| 6,442,714 | B1 * | 8/2002 | Griffin et al. | 714/46 |
| 6,470,364 | B1 * | 10/2002 | Prinzing | 715/530 |
| 6,490,349 | B1 * | 12/2002 | Garfinkel et al. | 379/265.02 |
| 6,558,431 | B1 * | 5/2003 | Lynch et al. | 715/513 |
| 6,606,619 | B2 * | 8/2003 | Ortega et al. | 707/2 |
| 6,725,423 | B1 * | 4/2004 | Muramoto et al. | 715/513 |
| 6,799,301 | B1 * | 9/2004 | Francis et al. | 715/523 |
| 6,842,755 | B2 * | 1/2005 | Maslov | 707/10 |
| 6,938,083 | B1 * | 8/2005 | Teague | 709/225 |
| 6,950,987 | B1 * | 9/2005 | Hargraves et al. | 715/523 |
| 6,952,779 | B1 * | 10/2005 | Cohen et al. | 726/22 |
| 2001/0027389 | A1 * | 10/2001 | Beverina et al. | 703/22 |
| 2001/0052910 | A1 * | 12/2001 | Parekh et al. | 345/744 |
| 2002/0015064 | A1 * | 2/2002 | Robotham et al. | 345/863 |
| 2002/0129023 | A1 * | 9/2002 | Holloway et al. | 707/10 |

(Continued)

OTHER PUBLICATIONS

Microsoft, Rich Text Format (RTF) Specification, 2002, Google, pp. 1-3, 104.*

(Continued)

*Primary Examiner*—Cong-Lac Huynh

(57) ABSTRACT

A Java based report generator for creating advanced graphics and text documents in Rich Text Format (RTF) is disclosed. An application program may generate a RTF document in one or multiple files using the present invention to produce displays and reports that are more complex than can be produced using standard Java. The provided class definitions allows a combination of text or graphics to be generated with flexible controls for general formatting and positioning of the application data and header information. The documents can be seen from several operating systems. The report generator models the application data in a tree structure and accepts a wide variety of formatting controls to produce drawings, text boxes, application data, paragraph format controls, etc.

24 Claims, 13 Drawing Sheets

U.S. PATENT DOCUMENTS

2003/0212960 A1* 11/2003 Shaughnessy et al. ...... 715/526
2003/0231216 A1* 12/2003 McBrearty et al. ......... 345/855
2004/0002325 A1* 1/2004 Evans et al. ............. 455/414.1
2004/0015367 A1* 1/2004 Nicastro et al. ................ 705/1
2004/0015866 A1* 1/2004 Estep et al. .................. 717/124
2004/0133848 A1* 7/2004 Hunt et al. ................... 715/500
2006/0173705 A1* 8/2006 Lee ............................... 705/1

OTHER PUBLICATIONS

Article entitled "Sun Announces Java Studio—Easiest Way To Create Dynamic Web Content With Java; "Java For The Rest Of Us" Tool", http://www.sun.com/smi/PressSunflash/9704/javastudio.html including related Building Web Services software manual.

* cited by examiner

FIG. 8C

811 — Name: 1.2.2.2.2 Paragraph -> Text Paragraph
Command:
RTFComponent          paragraph = new RTFComponent(
                       RTFComponent.TEXT_PARAGRAPH,
                       RTFComponent.PJUSTC);
    section.addChild(paragraph);

813 — Name: 1.2.2.2.2.1. Text Format -> Bold On.
Command:
paragraph.addChild(RTFComponent.BOLDON);

814 — Name: 1.2.2.2.2.2. Text.
Command:
paragraph.addChild(RTFComponent.TEXT,
         "TransPlan - Route Report");

812 — Name: 1.2.2.2.3. Paragraph -> Table.
Command:
RTFComponent table = new
RTFComponent(RTFComponent.TABLE,RTFComponent.TABLE_NONEF);
    sectionHead.addChild(table);

815 — Name: 1.2.2.2.3.1. Table Row.
Command:
table.addChild (new RTFComponent(RTFComponent.TABLEROW,column,cells));

816 — Name: 1.2.2.2.3.1.1 Cell.
Command:
cells [column] = new RTFComponent(RTFComponent.CELL,cell_size);

817 — Name: 1.2.2.2.3.1.1.1 Text (See 1.2.2.2.2.2. Text).
Command:
cells [column++].addChild(RTFComponent.TEXT,"I am a cell");

ADVANCED JAVA RICH TEXT FORMAT GENERATOR

BACKGROUND OF THE INVENTION

1. Field of the Invention

The present invention generally relates to generation of graphical reports and, more particularly, to generating advanced graphic displays from JAVA in one or several documents.

2. Background Description

Report generation from software applications running on computer-based systems is often a required function in order for users to view and interact with information concerning a particular application running on a system. Software applications of various type often control, monitor, or transform events within or in context of a particular machine or system and viewing the operation and work of the system is typically necessary.

The hardware and software operational environment of a software application is typically dependent upon the mission and purpose of the application but one of ordinary skill in the art would recognize that many different variations may exist to effect an overall application. Computer platforms may include embedded operating systems or distributed architectures. The processor and memories involved can be general purpose (such as personal computers) or specific to an application (such as digital signal processors or other embedded processors). These systems, in general, can control hardware inputs, respond to software events, analyze data, or initiate further process control. Typically, a software application must eventually communicate, display, or create reports for users. These reports may reflect, for example, status, processing history, results, message information, and the like associated with the nature of a particular application and its hardware environment.

The ability to generate reports is related to the inherent or supporting software functions within the chosen operating system and software language selected for use for a particular application. In a Java environment, there are several ways to generate a report. One simple option is just the generation of a text report. Another option is the generation of a graphic report in several documents. In addition, there is a way of generating a graphic report in one document from Java, but the report generated is very simple; advanced graphics controls and options are very limited and cumbersome.

As content data and organizational structure within a report grows, the ability to create a complicated report from Java diminishes and becomes more burdensome, if not impossible to generate. Complex formatting is not available for text and graphic reports. Composing a report document with graphic displays and text information with relational structure inherent in the document is also not available. If components (sections) of the report document could be treated as objects with associated formatting controls, the relationship among objects can be maintained and re-produced as needed with the same or different application data; but this currently does not exist.

When users generate a report with several documents, there is a risk that one or more of the documents can be lost or misplaced. As the number of individual reports increase, this risk also tends to increase. Even management of multiple documents can be more difficult since the relationship of related documents must be maintained in some fashion. User ability to view information in several reports can often be limiting since it is often more difficult to correlate information. Viewing information in one document is often more preferable than viewing information held in multiple documents since relationships present within the data can be more easily conveyed in a graphical manner, for example. Additionally, report generation applications are also routinely expected to be compatible among different operating systems.

The present invention is directed to overcoming one or more of these problems set forth above.

SUMMARY OF THE INVENTION

It is therefore an advantage of an embodiment of the present invention to provide a method and apparatus for generating complex information from a Java application in an easy but advanced graphical manner. This report generation can be in a single document or multiple documents. Additionally, if the report is in a single document, a user can manipulate the entire range of information in an easy manner.

It is another advantage of an embodiment of the invention to provide compatibility of documents among different operating systems, and further, to permit exporting of a report generated by this invention to become a part of a bigger report or even become a part of a larger report generation system.

The present invention is known as Advance Java Rich Text Format Generator (AJARG) and produces graphical or text reports in one or more documents in Rich Text Format (RTF) and can be seen by several operating systems. AJARG provides class definitions to create objects whereby advanced graphical output are produced and can be employed by any Java based application (or alternatively any object-oriented language) to produce complex graphical or text reports in one file in compliance with RTF standards. (Standard Java language has limited capability to produce advanced graphics)

The RTF document that AJARG creates is based upon a model tree document. The model creates a least three partitions including an INFO node (for capturing a title), a BODY node, and a TAIL node (to delimit the document). Multiple documents are possible. The BODY node comprises multiple layers of child nodes for capturing the content of the document which may include text, drawings (circles, polygons, lines, text boxes, etc.), tables, and formatting controls such as fonts, positions, sizes, bold on, bold off, etc. AJARG receives the report data and parameter information (fonts, position, size, bold on/off, drawing objects, etc.) and transforms the data and parameters into RTF compliant advanced graphical output in one or more documents that can be seen by one or more operating systems.

BRIEF DESCRIPTION OF THE DRAWINGS

The foregoing and other objects, aspects and advantages will be better understood from the following detailed description of a preferred embodiment of the invention with reference to the drawings, in which:

FIGS. 8A, 8B, and 8C are block diagrams showing the Java commands available to an application program to create an advanced graphical display or document according to the present invention.

DETAILED DESCRIPTION OF A DETAILED EMBODIMENT OF THE INVENTION

The present invention is directed towards a method and system for producing structured report document(s) comprising advanced graphics and text. A method of creating relational structure within a document and populating the document with desired application data including format control data is provided. This provides a much more flexible and powerful manner of creating report documents over that which can be accomplished using standard Java.

The present invention (referred hereinafter as Advanced Java Rich Text Format Generator (AJARG)) creates and generates advanced graphical software reports from Java (computer programming language) in one or several documents in Rich Text Format (RTF) that can be seen from several operating systems. Any software application can employ the mechanisms of AJARG to more robustly and flexibly create graphical displays and reports, which are not available with standard Java. AJARG provides structure to a report document that allows for application data and various types of objects (text boxes, graphs, drawings, etc.) to be created with relational structure so that the resulting report is independent of the size of the eventual display device (e.g., screen size). In embodiments, AJARG generates Rich Text Format (RTF) documents, which contain text and drawing objects that are independent of each other. By way of illustration, text coordinates are based on row and columns; whereas, drawings are based on twips. Twips (twentieth of a point) are screen-independent units to ensure that the proportions of screen elements are the same on all display systems. (A twip is defined as $\frac{1}{1440}$ of an inch or $\frac{1}{20}$ of a point, a traditional measure in printing. RTF requires screen positions and images to be specified in twips)

RTF does not indicate negative coordinates for a drawing object and the y-coordinates are oriented from top to bottom. In order to map coordinates appropriately, horizontal and vertical flips are managed with the relationships of:

If x2>x, then there is a horizontal flip whereby x=x2, and x2=x; and

If y2>y, then there is a vertical flip whereby y=y2, y2=y.

When ARJARG generates a report, these relationships are used and maintained so that AJARG reports are compliant with RTF specifications.

Figure 1A:
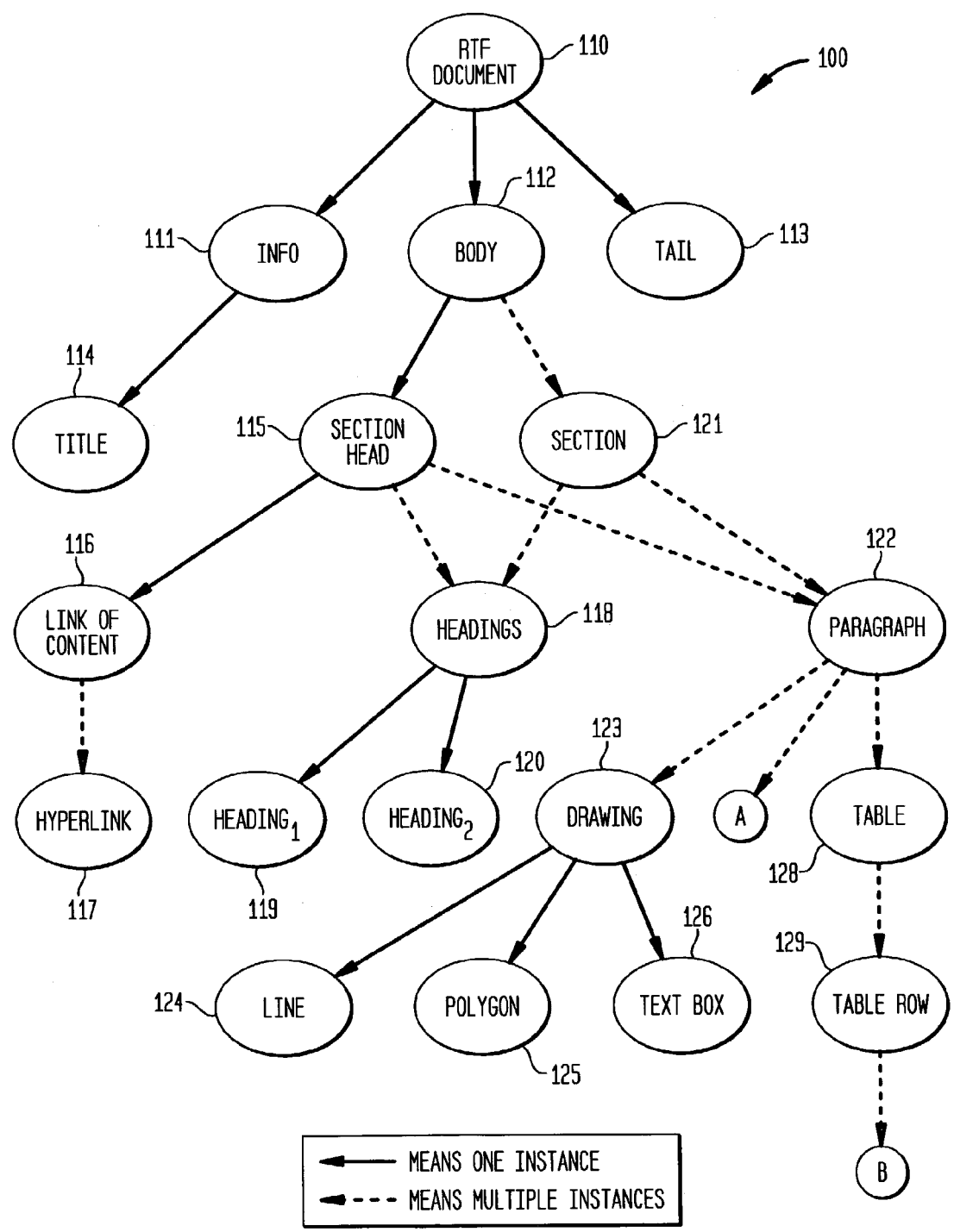
FIGS. 1A and 1B are generalized tree diagrams modeling a RTF document of the present invention.
Figure 1B:
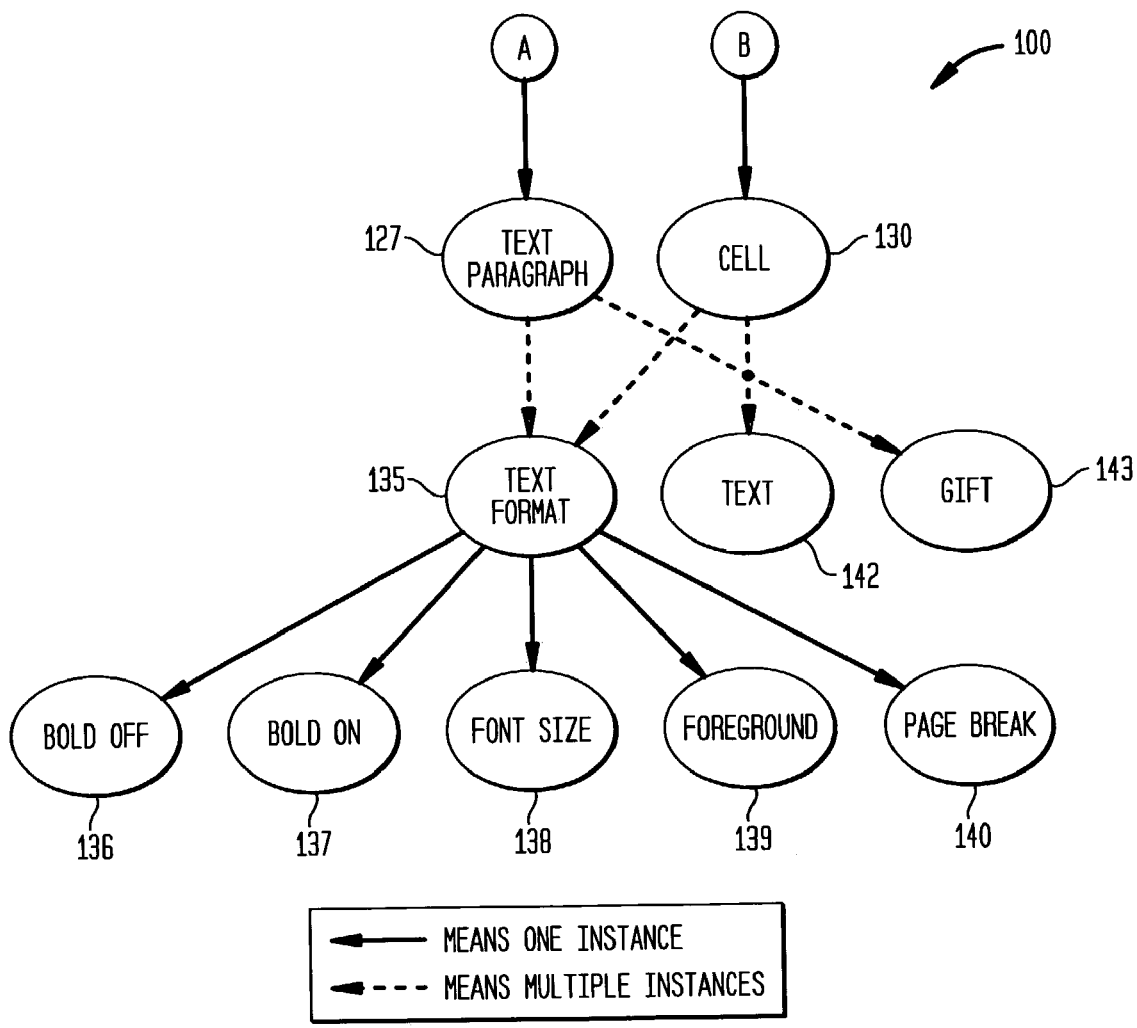

Referring now to FIGS. 1A and 1B, which describe embodiments of the present invention, in order to provide advanced graphics, the AJARG program concept models RTF documents as a hierarchical tree structure, generally depicted as 100, in a manner whereby the root node 110 is the RTF DOCUMENT. AJARG provides a class that defines a model of the tree structure and provides the methods and constructors to use the class. The internal nodes are further subdivided into internal nodes and/or leaf nodes. A leaf is an atomic node that is not further divided. A parent node is a node that has other nodes attached to it. And nodes that have a parent node, which is all nodes other than the root node, are called child nodes (collectively children nodes). Nodes that have no children are leaf nodes. In the Figures, dotted lines connecting a parent and a child indicate possible multiple instances of child nodes and/or grandchildren.

Still referring to FIG. 1, the model tree further comprises at the next logical layer an INFO node 111 that provides for naming the document (e.g., a title), BODY node 112 that provides for the objects (e.g., text, drawings, headers, paragraphs) to make up the core content of the document through its child nodes, and a TAIL node 113. The INFO node may have child nodes that provide general information such as a TITLE node 114. A TAIL node 113 delimits the overall document tree. The BODY node 112 may comprise multiple layers of child nodes, either SECTION HEAD nodes 115, which may be analogous to a "Table of Contents" in a book, and optionally, SECTION nodes 121, which provide for naming sections of the document and which any subsequent child nodes provide context for the section. A SECTION may be analogous to a chapter in a book that divides a document into logical parts.

Children of SECTION HEAD node 115 include LINK OF CONTENT node 116 providing linkages to other sources, provided by one or more child instances such as HYPERLINK 117. One or more instances of child node, HEADINGS 118, of SECTION HEAD node 115 (or of SECTION node 121) defines SECTION HEADINGS and further includes children such as HEADING$_1$ 119, and HEADING$_2$, 120. The children nodes 119 and 120 provide for intra-section headings, typically a line of text, or alternatively a more complex content. HEADINGS node 118 provides a title hierarchy to the document. Generally, HEADING$_1$ 119, could be the parent title of sub-title HEADING$_2$, 120. For example, "Pets" can be the parent title (HEADING$_1$, 119) and "Cats" the sub-title (HEADING$_1$, 120). Even more heading/sub-heading nodes are possible, as necessary. SECTION HEAD node 115 may also include multiple instances of a PARAGRAPH child node 122 providing for the content, format, and the structure of paragraphs typically text but including symbols or special characters. A PARAGRAPH node 122 comprises the body part of the SECTION HEAD node 115 and SECTION node 121.

PARAGRAPH node 122 comprises child nodes DRAWING 123 that provides for the structure of a drawing (line, text, etc.), TEXT PARAGRAPH 127 for providing text information and structure, and TABLE 128 for providing text and numeric structure in tabular format. These objects define the content of a given paragraph. The DRAWING node 123 may include the definitional child nodes LINE 124, POLYGON 125, and TEXT BOX 126. A POLYGON 125 may be representative of a sequence of connected lines. Hence, it is more efficient to have a POLYGON node 125 rather than several LINE nodes 124 for drawing connected lines. The TABLE node 128 may include multiple instances of a child node TABLE ROW 129, which may in turn include multiple instances of a child node CELL 130 that may also include numeric information or equations. A CELL node 130 is the (row, column) object of a table and the column object of a TABLE ROW node129.

FIG. 1B shows the possible children nodes of TEXT PARAGRAPH node 127 and CELL node 141. The children include one or more instances of TEXT FORMAT node 135 providing the format of the text within the paragraph, TEXT node 142, and GIFT node143.

The children of TEXT FORMAT node 135 include BOLD OFF node 136, BOLD ON node 137 to provide for controlling the boldness of text, FONT SIZE node 138 providing text and numeric character size, FOREGROUND node 139 providing for display presentation control, and PAGE BREAK node 140 to provide for pagination control. AJARG can import a GIF (Graphics Interchange Format) file into the report file with its GIFT leaf node.

It is apparent to one of ordinary skill in the art that other nodes or combination of nodes defining additional attributes could be employed within the tree structure essentially at any level (and objects of these nodes instantiated as necessary). Conceivable multiple documents could be created in one file producing volumes.

FIGS. 1A and 1B are not dispositive of all possible nodes and the present number should not be limited to only those nodes shown in FIGS. 1A and 1B. Variations in structure are possible.

AJARG ILLUSTRATIVE EXAMPLE

Figure 2A:
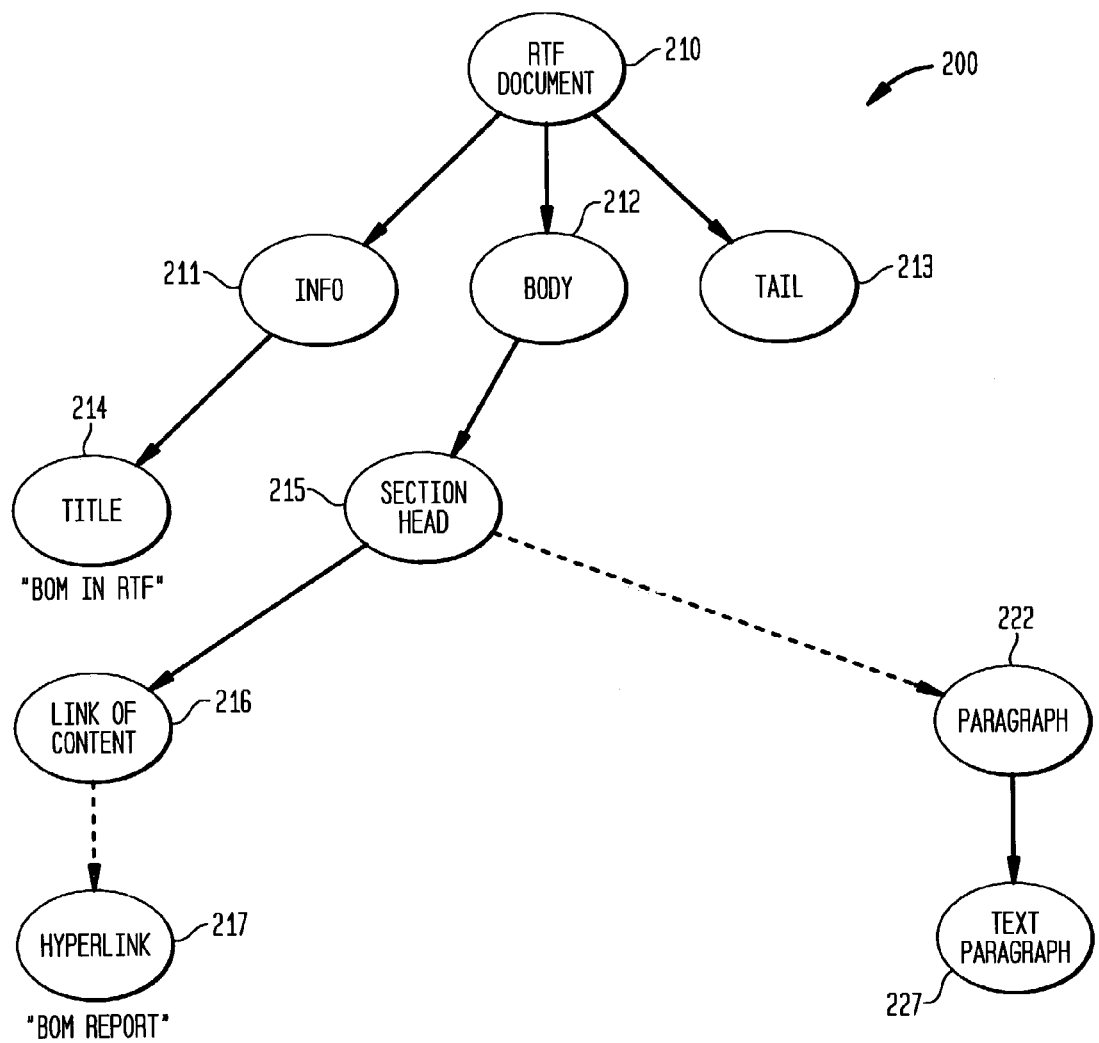
FIGS. 2A and 2B are tree diagrams illustrating examples of the present invention.
Figure 2B:
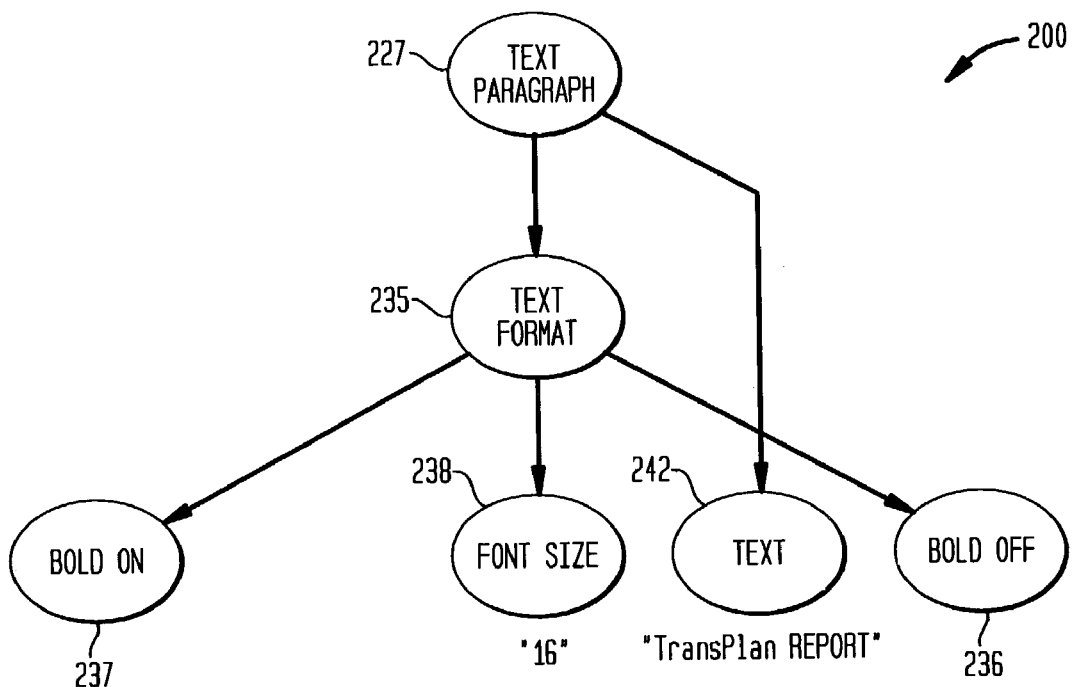

The following Java pseudo-code sequence of the present invention illustrates the creation of a RTF document tree corresponding to the RTF document tree instance shown in FIGS. 2A and 2B according to an embodiment of the present invention. In this code example, however, no DRAWING or HEADINGS objects are utilized. Accordingly, no DRAWING or HEADINGS nodes are shown in FIGS. 2A and 2B. Supporting class definitions and methods for AJARG may occur in a package definition.

sequences could be employed to create different report documents, this example is meant to demonstrate one instance. As illustrated various portions of the report generator class hierarchy can be initialized as necessary.

Figure 3:
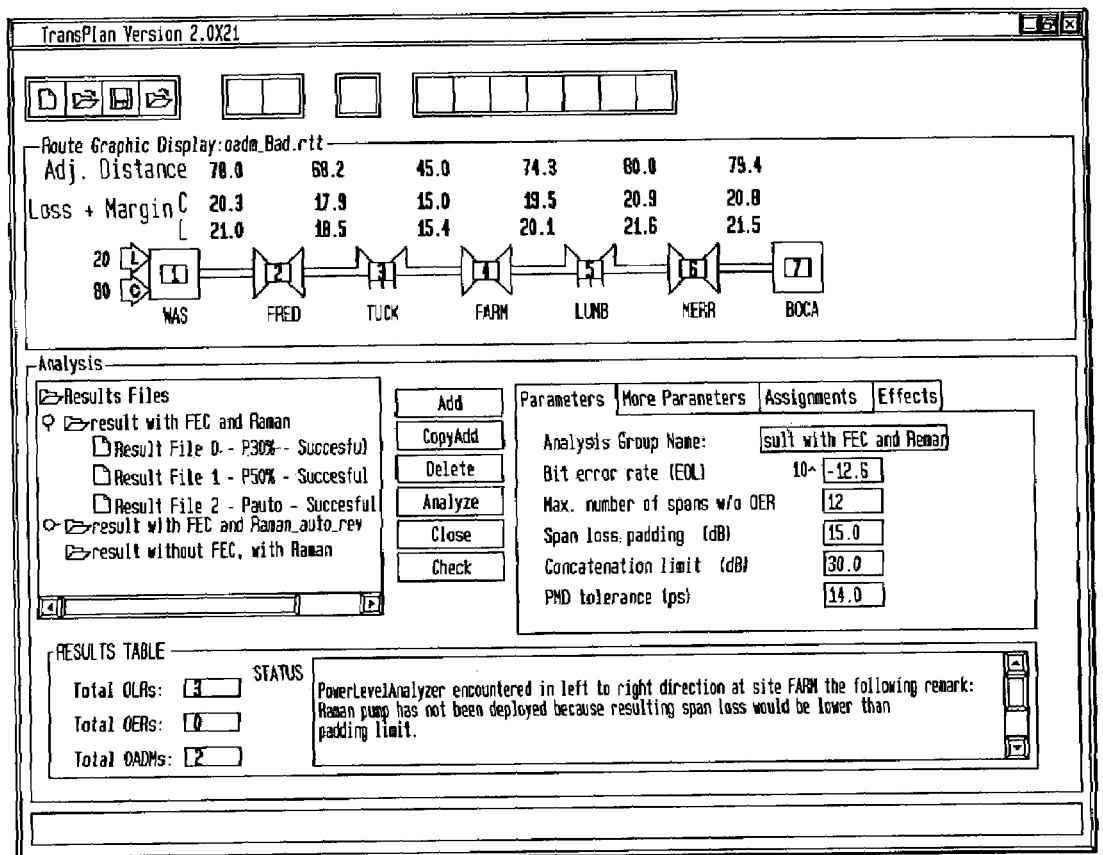
FIG. 3 is an illustrative example of an application user interface capable of requesting a basic graphical report generation.

FIG. 3 shows an illustrative user interface for an application program for telecommunications and is a typical example of an application that eventual has a need to generate a basic graphical report. Other application programs could employ this present invention also. This representative application monitors the status and operational performance of communications over optical fiber transport spans, however, possible fields of use is not limited to this example. This representative application acquires application data from its hardware environment and relies upon AJARG to create a report. The user interface of this representative application FIG. 3 invokes monitoring a span from Washington (WAS) to Boca Raton, Fla. (Boca) with five intermediary signal regeneration locations (i.e., FRED, TUCK, FARM, LUMB, MERR), generally denoted as 300. A user can select several parameters to instigate a monitoring and reporting session. The results of the monitoring are passed to AJARG as application data along with format control data to create a report, shown in FIG. 4.

Figure 4:
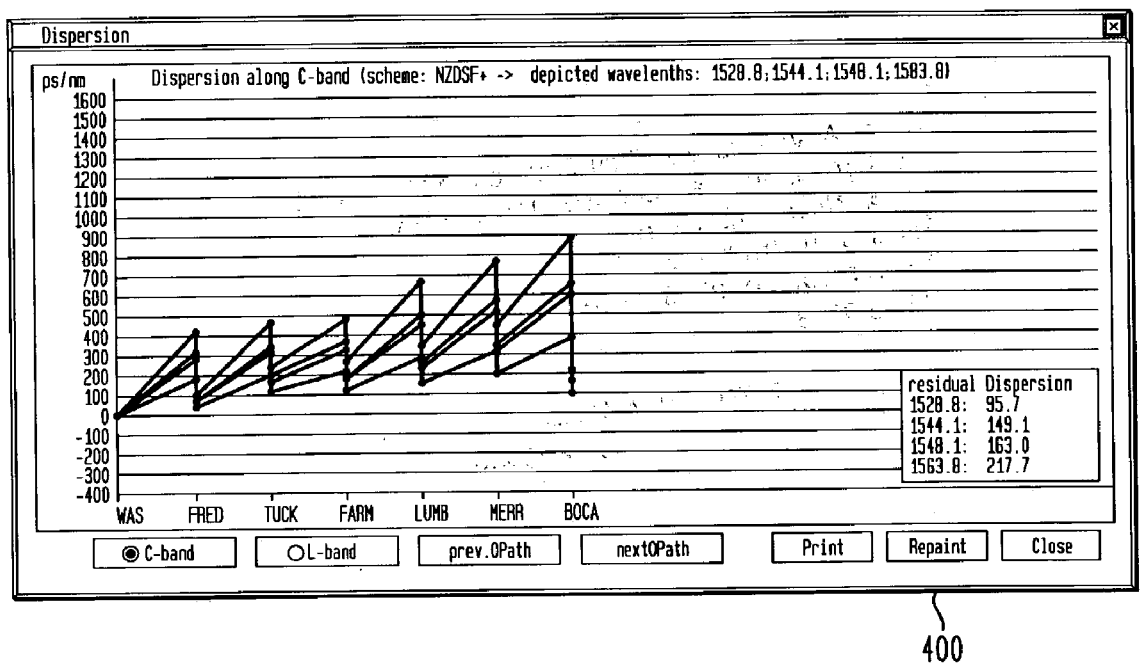
FIG. 4 is an illustrative example of a basic graphical display as requested by the user interface of FIG. 3.

FIG. 4 shows an illustrative dispersion diagram along a C-band (i.e., a particular optical frequency range) at each of the selected locations from Washington (WAS) to Boca Raton (Boca), generally denoted as 400. This shows the graphical output of the report as produced by AJARG based upon modeled application and format data using the class definitions provided by AJARG.

```
doc = new RTFComponent(RTFComponent.RTF);
    info = new RTFComponent(RTFComponent.INFO);
    doc.addChild(info);
        info.addChild(RTFComponent.TITLE, "BOM in RTF");
    body = new RTFComponent(RTFComponent.BODY);
    doc.addChild(body);
        sectionHead = new RTFComponent(RTFComponent.SECTION_HEAD);
        body.addChild(sectionHead);
            sectionHead.addChild(new RTFComponent(RTFComponent.LOC,
                "BOM Report",1,BOM_REPORT));
            paragraph=newRTFComponent(RTFComponent.TEXT_PARAGRAPH;
            sectionHead.addChild(paragraph);
                paragraph.addChild(RTFComponent.BOLDON);
                paragraph.addChild(RTFComponent.FONT_SIZE,16);
                paragraph.addChild(RTFComponent.TEXT,"TransPlanReport");
                paragraph.addChild(RTFComponent.BOLDOFF);
    tail = new RTFComponent(RTFComponent.TAIL);
    doc.addChild(tail);
```

Figure 5:
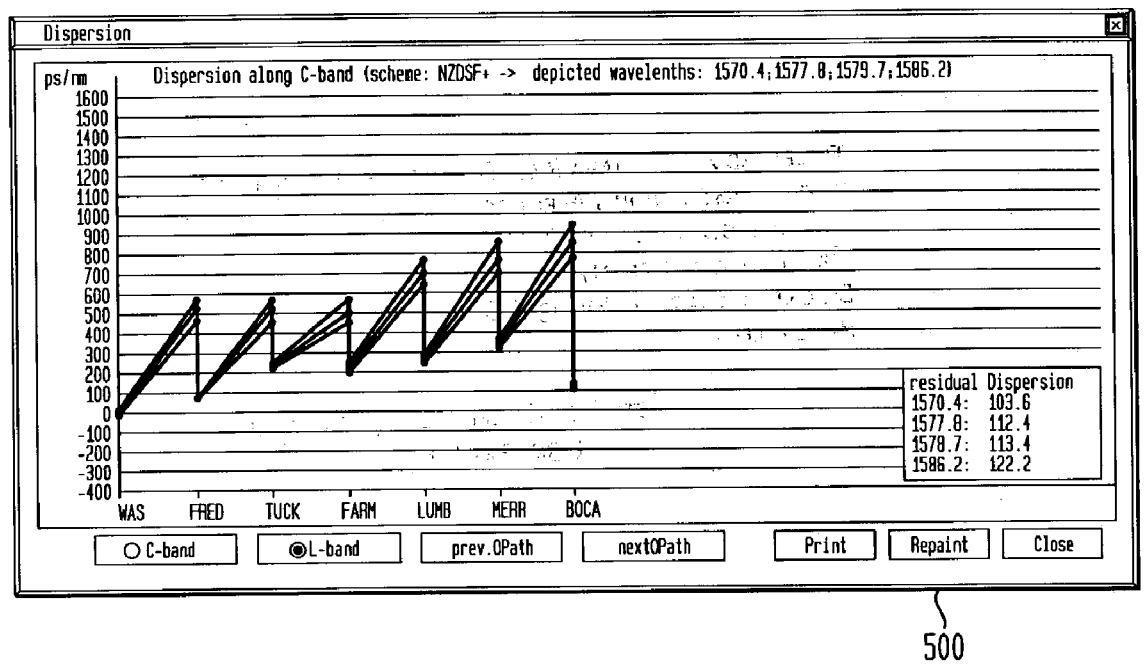
FIG. 5 is an illustrative example of another basic graphical display as requested by the user interface of FIG. 3.

The illustrative tree shown in FIGS. 2A and 2B, and shown generally as 200, corresponds to above example, and has RTF DOCUMENT 210 as the root node and its TITLE node 214 is "BOM in RTF" from the INFO node 211. RTF DOCUMENT 210 has a SECTION HEAD node 215 from the BODY node 212. Furthermore, SECTION HEAD node 215 has two children nodes. One child is LINK OF CONTENT node 216 with "BOM Report" as the HYPERLINK node 217 and the other child is PARAGRAPH node 222 with child TEXT PARAGRAPH node 227. The TEXT PARAGRAPH node 227 (FIG. 2B) has children TEXT FORMAT node 235 and TEXT node 242, shown illustratively as "TransPlan Report". The children of TEXT FORMAT 235 are BOLD ON node 237, BOLD OFF node 236, and FONT SIZE node 238, set to "16". Various other FIG. 5 shows another output from a different monitoring session. This time, it is a dispersion diagram for the same transport route but for the L-band (i.e., another optical frequency range), generally denoted as 500. Again, this shows a basic graphical output of a report as produced by AJARG based upon the application data and format data passed to AJARG using the provided class definitions.

Figure 6:
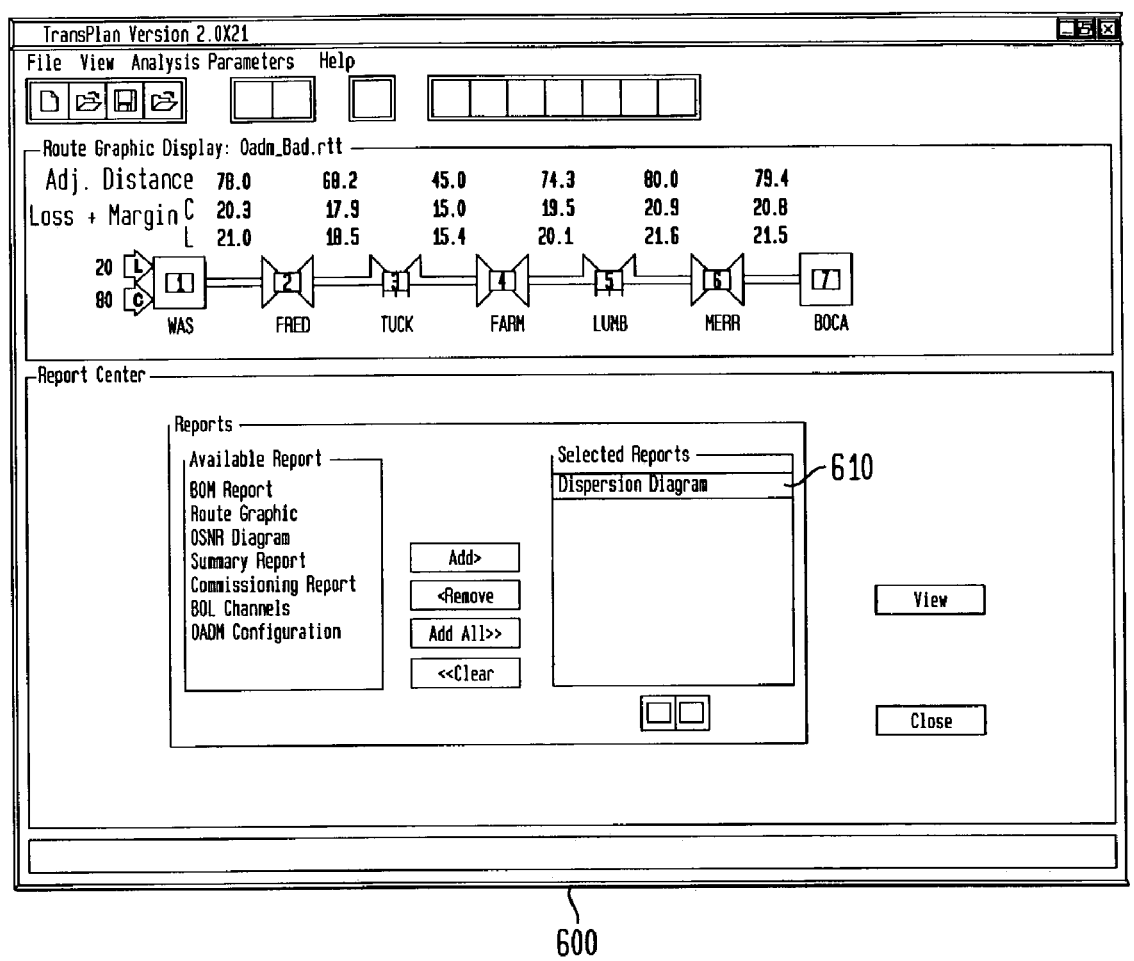
FIG. 6 is an illustrative application user interface capable of requesting an advanced graphical report of the present invention.
Figure 7:
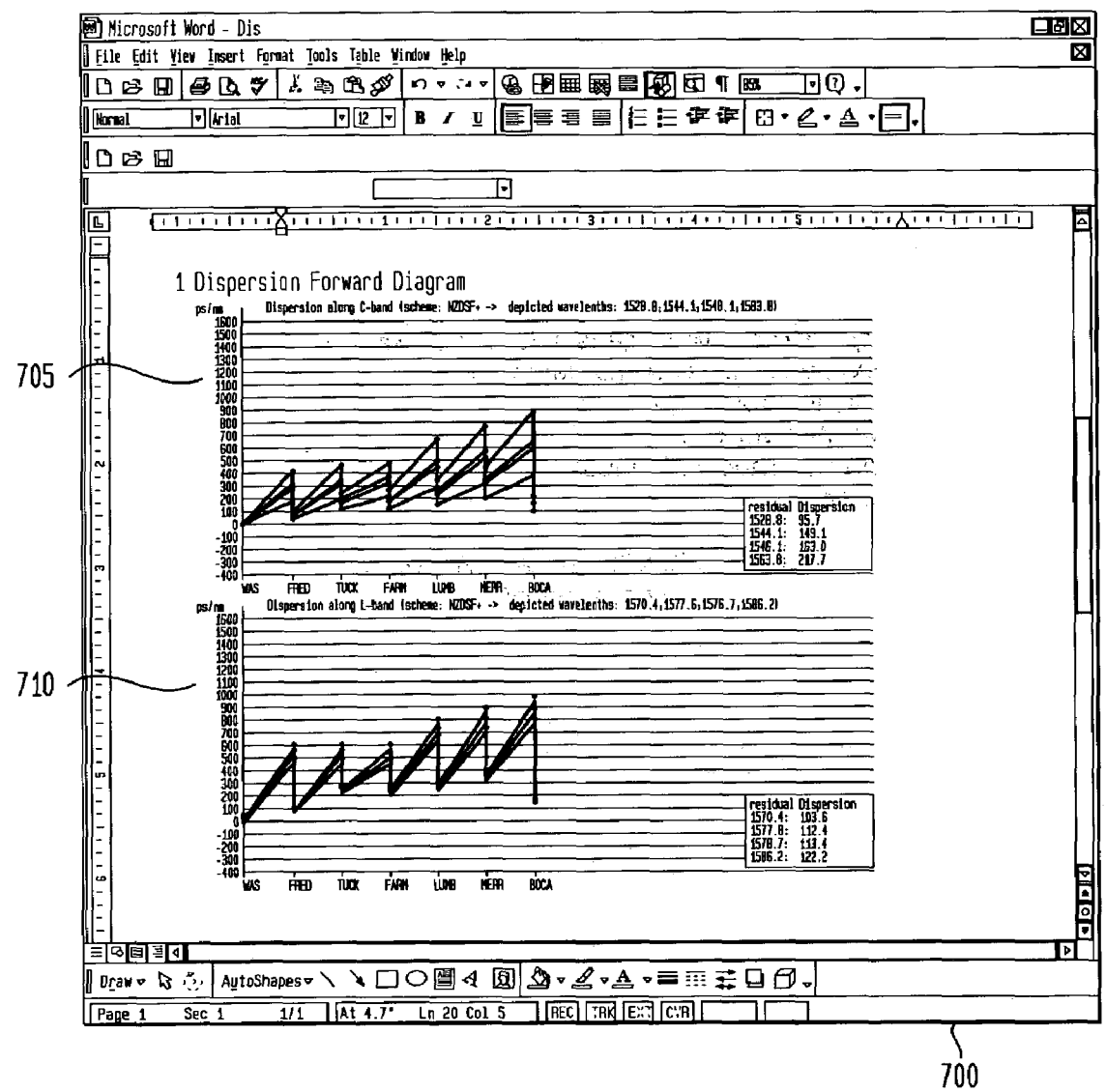
FIG. 7 is an advanced graphical report generated by the present invention.

FIG. 6 is a user interface similar to the user interface of FIG. 3 and generally denoted as 600. This interface provides a selection option 610 which will cause the representative TransPlan application to pass C-band and L-band dispersion data along with formatting information (fonts, sizes, colors, textures, positions, shapes, e.g., lines, squares, circles, etc.) via the class definitions. AJARG then models the data as pursuant to, for example the modeling shown in FIGS. 1A and 1B, creating the advanced combined graphical report as shown in FIG. 7, in a structure as provided by the hierarchical class definition objects. It should be noted by those of ordinary skill in the art that the graphical output is substantially more complex than what can be produced by Java without the aid of the present invention. The relational structure of the component objects in the display is established through the class definitions and the initialized objects based in turn upon the application data provided by the application program.

Using AJARG

Figure 8A:
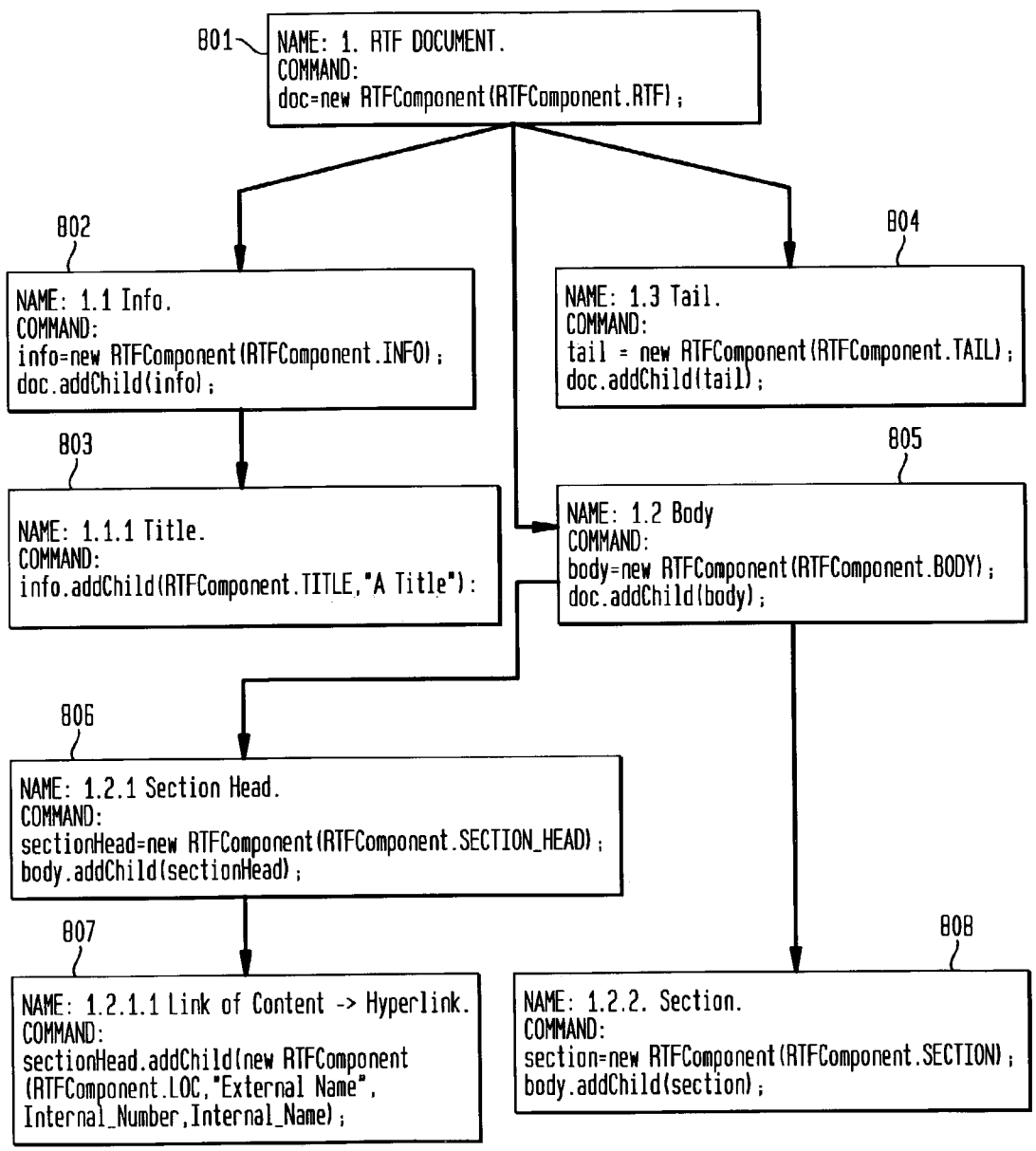

FIG. 8A shows examples of possible object-oriented (O—O) commands provided by AJARG to be used by an application. This diagram is both a block diagram and a general flow diagram. These commands and supporting logic can be embodied within a software program resident on a computer platform, computer memory, computer disc, or incorporated into a larger software system. The commands and supporting class can be distributed on computer medium such as floppy diskette, disk, digital video disc (DVD), or compact disc read only memory (CD-ROM) or the like. It could even be distributed electronically over mediums such as the Internet. The example is shown using Java although any other O—O language could be employed with appropriate conforming changes. The overall structure of FIGS. 8A–8C parallel the overall hierarchical tree structure of FIGS. 1A and 1B. Multiple object instances can be created according to the tree structure of FIGS. 1A and 1B. The blocks of FIGS. 8A–8C include an indexing scheme (1., 1.1, 1.1.1, 1.2.1, etc.) on the Name line in each block simply as a visual aid to track hierarchical relationships within the Figures.

By way of explanation, a new document is instantiated as shown at block 801. Instantiation of an INFO object is shown at block 802 with a title created in block 803. A TAIL object is created in block 804. A BODY object is instantiated in block 805 with a SECTION HEAD object created in 806 which may further add a LINK OF CONTENT object in block 807. LINK OF CONTENT object in block 807 provides Hyperlinks, equivalent to Internet http hyperlinks, in the report. As an example, the Hyperlinks have a blue-underlined font in a Microsoft Word® browser (Word®) is a registered trademark of Microsoft Corporation). If a user presses a Left Mouse Click in the Hyperlink "External Name," the report browser (e.g., MS Word®) will jump to the title specified by HEADINGS in block 809. The LINK OF CONTENT→Hyperlink in block 807 "Internal Name," which may be a number, and should be the same as in HEADINGS of block 809 "Internal Number" in order to execute the browser jump. In addition, the LINK OF CONTENT→Hyperlink in block 807 "Internal Number" is the tab depth level of the LINK OF CONTENT→Hyperlink in block 807 "External name." As a result, the Hyperlinks can produce a hierarchic title table of contents. As an example, LINK OF CONTENT→Hyperlink (External Name="Go TO Cats", Internal Number=2, Internal Name=102) jumps to HEADING₂ (External Name="Cats", Internal Number=102). In this sample, "102" connects the "Go To Cats" with "Cats."

Figure 8B:
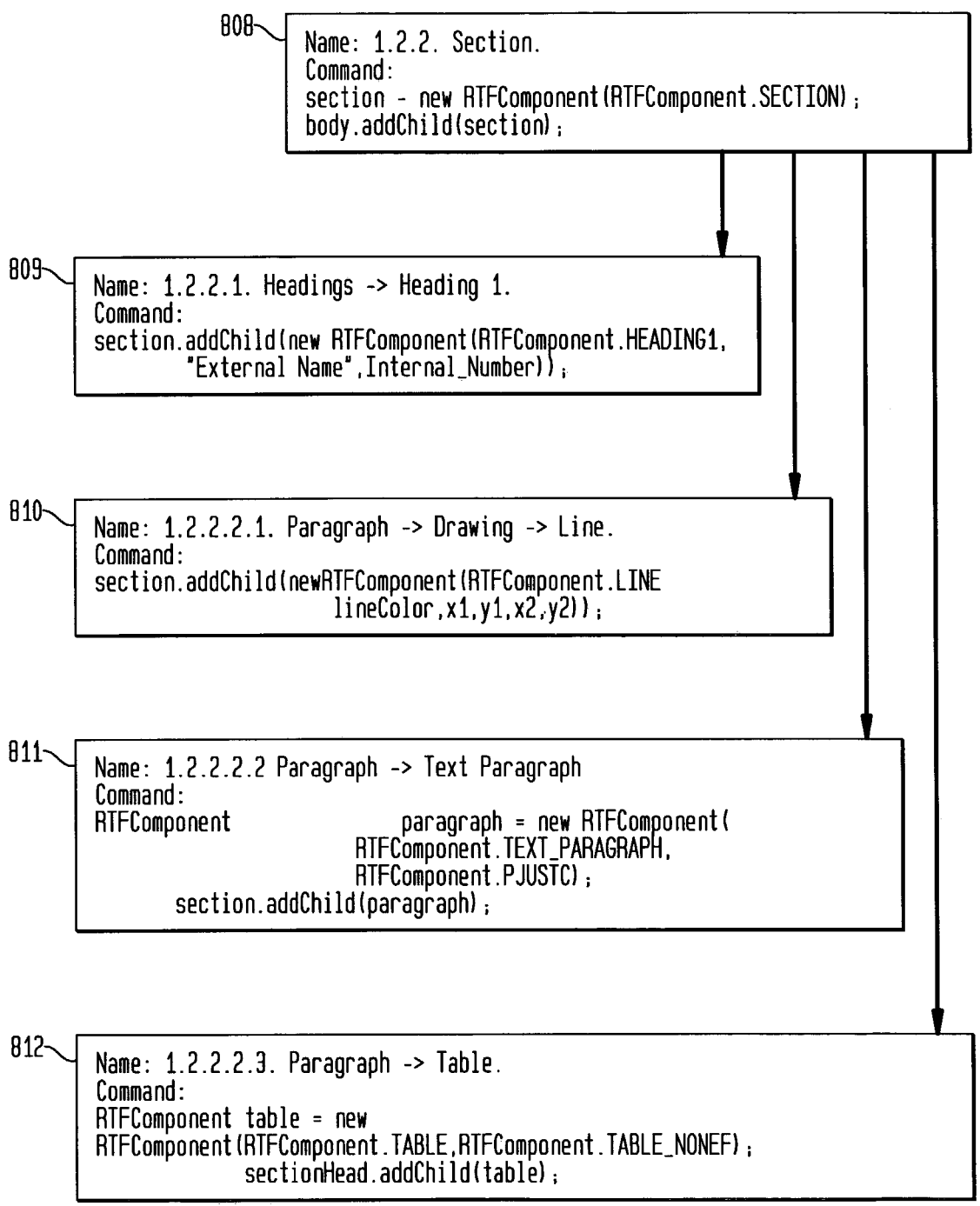

A SECTION object can be instantiated in block 808 as a child of object BODY. In FIG. 8B, several children objects of SECTION node can be optionally created including HEADINGS in block 809, LINE in block 810, TEXT PARAGRAPH in block 811, and TABLE in block 812. A TEXT PARAGRAPH object can be created with the attribute PJUSTC (Paragraph Justification: Center) in order to have a centered paragraph. If PJUSTC is not specified, the paragraph will have left justification as default. Various PARAGRAPH children can be created and initialized. A TEXT PARAGRAPH object can be created with such attributes as BOLD ON, BOLD OFF, and TEXT in blocks 813 and 814, as necessary. A TABLE object can be created with various attributes such as TABLE ROW, CELL and TEXT as shown in blocks 812, 815, 816, 817, respectively.

Once AJARG has received all of the document definitions with all the data and is delimited by the TAIL, AJARG creates the RTF document in a single file for visual reporting either on a display terminal or other communication device. The AJARG creates the representation adherent to the coordinate system for screen-independent convention, e.g., rows and columns for text and twips for drawings. The file may be stored in a database or associated with a larger report generating system for subsequent use.

Figure 9:
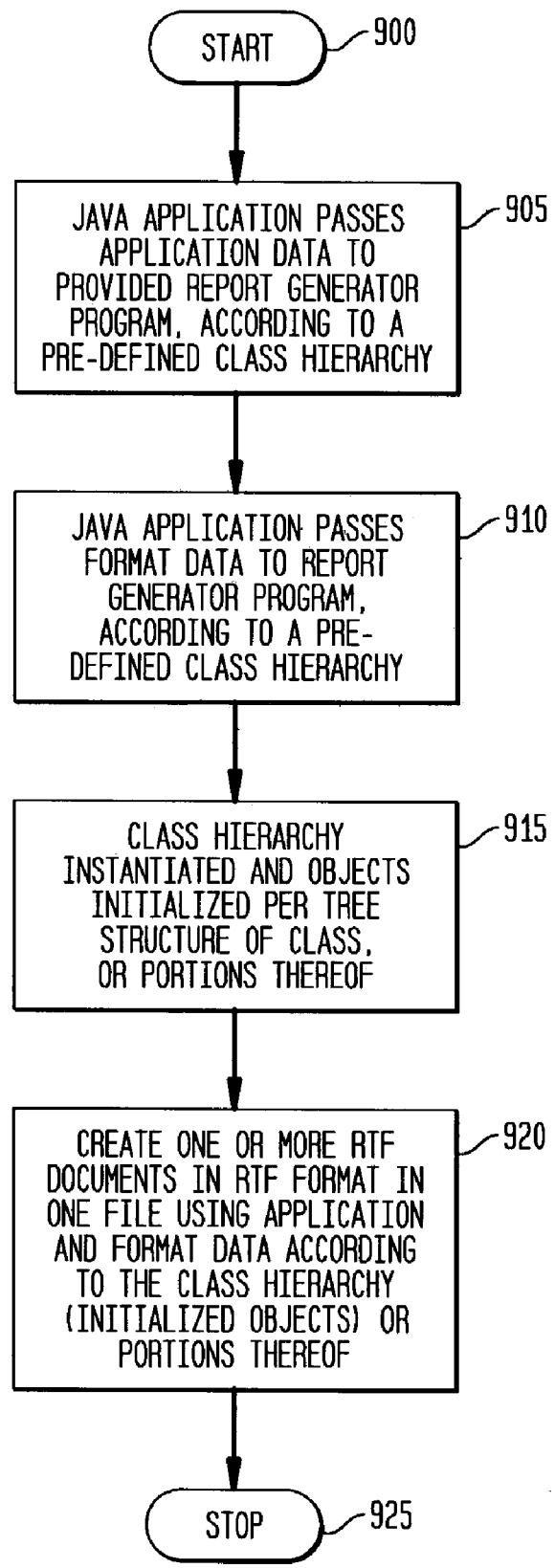
FIG. 9 is a flow diagram illustrating the use of the present invention.

FIG. 9 is a flow diagram showing the steps of implementing the method of the present invention. The steps of the present invention may be implemented on computer program code in combination with the appropriate hardware. This computer program code may be stored on storage media such as diskette, hard disk, CD-ROM, DVD-ROM or tape, as well as a memory storage device or collection of memory storage devices such as read-only memory (ROM) or random access memory (RAM). Additionally, the computer program code can be transferred to a workstation over the Internet or some other type of network. FIGS. 8A–8C, and 9 may equally represent a high-level block diagram of the system of the present invention, implementing the steps thereof. The components could be re-arranged to separate functions into more or less components as shown in the Figures.

The overall process of using the present invention begins at step 900. At step 905, a Java application uses the present invention to generate a report by passing application specific data to the report generator of the present invention. This application data is passed in conformity with a pre-defined class hierarchy. At step 910, the Java application passes format data to the report generator according to the class hierarchy. This data may include such format information as fonts, sizes, colors, textures, position, shapes—i.e., lines, polygons, squares, circles, etc. The report generator provides class instantiation to create and initialize the class objects. At step 920, the report generator (i.e., AJARG) creates one or more documents in RTF format in one file using the application and format data as provided by the application program. The document is created to be display independent and can be seen by different operating systems.

While the invention has been described in terms of preferred embodiments, those skilled in the art will recognize that the invention can be practiced with modifications and in the spirit and scope of the appended claims.

I claim:

1. A method for generating an advanced text and graphical output where the output is created according to Rich Text Format (RTF), the method comprising the steps of:
    providing a JAVA based report generator associated with a class hierarchy which is representative of segmental structures of a RTF document;
    passing application data and format data to the report generator to initialize portions of the class hierarchy, the portions of the class hierarchy comprising less than all of the class hierarchy; and
    via the JAVA based report generator, creating a structured document in RTF based on the initialized portions of the class hierarchy, the structured document comprising a drawing object, the drawing object positioned via a vertical flip and a horizontal flip of map coordinates of said drawing object.

2. The method according to claim 1, further comprising the step of Instantiating the class hierarchy.

3. The method according to claim 1, wherein the passing application data step comprises passing at least one of text data and graphical data.

4. The method according to claim 1, wherein the application data represents information produced by the application and incorporated into the RTF document, the application data including one of status information, historical information, measurement information, and message information.

5. The method according to claim 1, wherein the format control data comprises at least one of position information, size information, font information, color information, texture information, foreground information, page break information, bolding information, and shape information.

6. The method according to claim 1, wherein the structured document is a report having graphical and textual objects independent of each other.

7. The method according to claim 1, wherein the class hierarchy is a pre-defined class hierarchy and when instantiated comprises a ROOT node, an INFO node, a BODY node, and a TAIL node, wherein the ROOT node is the RTF document.

8. The method according to claim 7, wherein:
the INFO node defines a title; and
the TAIL node is a leaf node which delimits the RTF document.

9. The method according to claim 7, wherein the BODY node further comprises a SECTION HEAD node.

10. The method according to claim 9, wherein the SECTION HEAD node further comprises at least one of a HEADINGS node and a LINK OF CONTENT node, wherein the LINKOF CONTENT node comprises one or more HYPERLINK nodes.

11. The method according to claim 9, wherein the BODY node further comprises one or more instances of a SECTION node.

12. The method according to claim 11, wherein at least one of the SECTION HEAD node and the one or more instances of a SECTION node further comprises one or more instances of a PARAGRAPH node.

13. The method according to claim 11, wherein the one or more instances of the SECTION node includes one or more instances of a HEADINGS node.

14. The method according to claim 12, wherein the one or more instances of a PARAGRAPH node comprises at least one of a DRAWING node, a TEXT PARAGRAPH node, and a TABLE node.

15. The method according to claim 14, wherein the DRAWING node includes at least one of a LINE node, POLYGON node, and a TEXTBOX node.

16. The method according to claim 14, wherein the TEXT PARAGRAPH node comprises at least one TEXT FORMAT node, wherein the at least one TEXT FORMAT node comprises at least one of a format control node for formatting text and graphics.

17. The method according to claim 14, wherein the TABLE node comprises one or more TABLE ROW nodes and wherein the one or more TABLE ROW nodes comprises one or more CELL nodes.

18. The method according to claim 17, wherein the one or more CELL nodes comprises at least one of a TEXT FORMAT node, a TEXT node, and a GIFT node.

19. A method for generating an advanced text and graphical output where the output is created according to Rich Text Format (RTF), the method comprising the steps of:
providing a JAVA based report generator associated with a class hierarchy which is representative of a RTF document structure;
instantiating the class hierarchy;
passing application data and format data to the report generator to initialize the class hierarchy, the portions of the class hierarchy comprising less than all of the class hierarchy; and
via the report generator, creating in at least one file a structured document in RTF format based on the initialized class hierarchy, the file comprising a drawing object, the drawing object positioned via a vertical file and a horizontal flip of map coordinates of said drawing object.

20. The method of claim 19, wherein the class hierarchy includes a ROOT node, an INFO node, a BODY node, and a TAIL node.

21. A system for generating an advanced text and graphical output wherein the output is created according to Rich Text Format (RTF) from commands provided by the system and used by an object-oriented application program, the system comprising:
a component for instantiating a class tree structure according to a pre-defined class;
a component for initializing objects of the class tree structure with data provided by the object oriented application program, the data indicative of report contents and format;
a component for formatting a document in RTF format based upon the initialized objects of the class tree structure; and
a JAVA based component for creating one or more RTF documents in at least one file according to the contents of the initialized objects, each of the RTF documents comprising a drawing object, the drawing object positioned via a vertical flip and a horizontal flip of map coordinates of said drawing object.

22. A means for generating an advanced text and graphical output wherein the output is created according to Rich Text Format (RTF) from commands executed by an object-oriented application, the means comprising:
means for passing application data from the object-oriented application to a JAVA based report generator according to a pre-defined class hierarchy;
means for passing format control data from the object-oriented application to the JAVA based report generator according to a pre-defined class hierarchy; and
means for creating a document in RTF format using the application data and format control data to compose the RTF document in at least one file, the document comprising a drawing object, the drawing object positioned via a vertical flip and a horizontal flip of map coordinates of said drawing object.

23. The means according to claim 22, wherein said means resides in one of a computer memory, a disk, floppy diskette, tape, digital video disc (DVD), and a CD-ROM.

24. A machine-readable medium comprising machine instructions for activities comprising:
via a JAVA based report generator, creating a structured document in RTF based on initialized portions of a class hierarchy, the structured document comprising data obtained from an application, the structured document created responsive to format data received from an object-oriented application, the structured document comprising a drawing object, the drawing object positioned via a vertical flip and a horizontal flip of map coordinates of said drawing object.

* * * * *